July 27, 1937.    M. W. KENNEY ET AL    2,087,913

FLOAT VALVE

Filed Aug. 26, 1935

Inventors:
Mahlon W. Kenney
Arthur R. Constantine
Cecil W. Preston
By: Cox & Moore attys Patented July 27, 1937

2,087,913

UNITED STATES PATENT OFFICE 2,087,913

FLOAT VALVE

Mahlon W. Kenney and Arthur R. Constantine, River Forest, and Cecil W. Preston, Chicago, Ill., assignors, by mesne assignments, to Reconstruction Finance Corporation, Chicago, Ill., a corporation Application August 26, 1935, Serial No. 37,863

8 Claims. (Cl. 137—104)

Our invention relates in general to valves and has more particular reference to an improved float valve suitable for fluid flow control, the invention being particularly well adapted to the control of the flow of a refrigerating medium in liquid condition in a refrigerating system embodying the compression-condensation-evaporation cycle, wherein a suitable fluid refrigerating medium is cyclically compressed in gaseous form, condensed to liquid form and then evaporated for the purpose of absorbing heat.

An important object of the invention resides in providing a valve, more particularly a float valve which opens and closes rapidly.

Another important object is to provide a float valve embodying a float and a shiftable valve element and yielding means interconnecting the same whereby the valve element may shift rapidly from closed to open position and vice versa.

Another important object is to provide a float valve for use in a refrigerating system of the character mentioned herein wherein a shiftable valve element is yieldingly connected to a float whereby suction applied on the valve element through its co-operating valve seat may shift the valve element to valve closing position rapidly whenever the float lowers the element to a predetermined elevation in the valve assembly.

Another important object of the invention is to provide a float valve of simple, inexpensive construction, and particularly adapted for incorporation in a refrigerating system embodying the compression-condensation-evaporation refrigerating cycle, in order to control the flow of liquid refrigerant from the condenser to the evaporator and at the same time separate the high and low pressure zones of the system.

Another important object is to provide a float valve having a shiftable valve element and a float for controlling the same, wherein the movement of the valve element and the float is determined by a common guide element; a further object being to form the guide element as a sleeve received within the float and, in turn, receiving the valve element.

Another important object is to mount the guide sleeve in an element forming a valve seat adapted to co-operate with the shiftable valve element in performing the valving function and to support the valve element and the float entirely on the guide.

Another important object is to arrange the float valve mechanism in a sheet metal casing with the valve seat element sealed in an opening in the casing, the guide sleeve and the valve element and float being carried on said element within the casing.

Another important object is to mount the float on the valve element in a yielding fashion, providing a shock absorbing effect between the parts and permitting the valve element to engage the seat under the influence of suction applied at said seat whenever the liquid level in the casing is low enough to permit the valve element to come within the influence of said suction.

Another important object is to provide co-operating means between the valve element and its supporting sleeve to prevent relative rotation of the valve within the sleeve and with respect to the valve seat.

Another important object resides in providing a float controlled valve in a refrigerating system of the character mentioned, said valve being positioned to receive liquid refrigerant under pressure from the condenser of the system, and being adapted to maintain a quantity of liquid refrigerant therein while delivering refrigerant to the evaporator as needed to maintain the desired liquid refrigerant level in the evaporator.

A further object is to form the valve with an air and liquid type inlet through which the refrigerating medium may be introduced into the system, and through which any air entrapped in the system may be withdrawn.

These and numerous other objects, advantages and inherent functions of the invention will become apparent as the same is more fully understood from the following description, which, taken in connection with the accompanying drawing, discloses a preferred embodiment of our invention.

Referring to the drawing.

Figure 3:
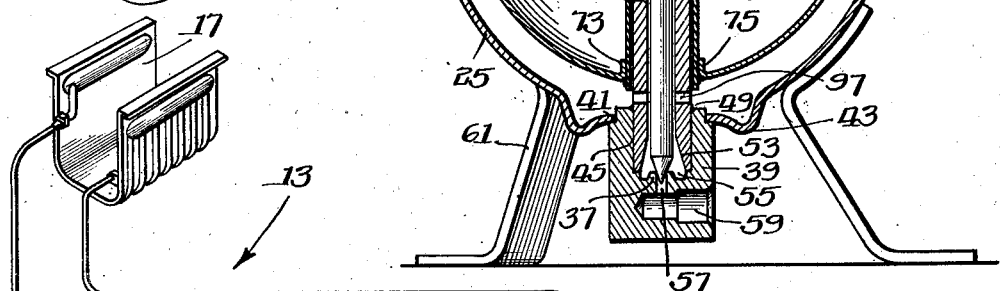
Fig. 3 is a schematic view illustrating a condenser-compressor-expander refrigerating system in which the valve assembly may be used to advantage.

To illustrate our invention, we have shown on the drawing a valve assembly 11 which is particularly adapted for use in a refrigerating system 13 of the so-called condenser-compressor-expander type, although, of course, it is obvious that the utility of the float valve and many of its features is not necessarily restricted to refrigeration. The valve, however, is particularly advantageous when used in a system of the character mentioned, for which reason we have shown the valve assembled in a refrigerating system 13 comprising a compressor 15 having its suction side connected with an evaporator or expander 17, and its pressure or delivery side connected with a condenser 19 which, in turn, is connected with the expander so that a gaseous refrigerant may be drawn from the evaporator or expander 17 into the compressor and compressed therein, being thence delivered in compressed, gaseous condition to the condenser where the refrigerant may be cooled and liquefied, the liquid refrigerant being delivered thence to the evaporator where it boils with consequent absorption of heat. The gases evolved by the evaporation of the liquid refrigerant in the expander 17 are, of course, drawn into the compressor for a repetition of the refrigerating cycle. It will be seen that the expander 17, during the operation of the system, will be maintained at the suction pressure of the compressor while the refrigerant in the condenser 19 will be maintained at delivery pressure. It is necessary, therefore, to provide means in the connection between the condenser and the evaporator to separate the high and low pressure zones of the system in order to permit the same to operate as a refrigerator. To this end we propose the improved valve of our present invention which, in Fig. 3, is shown interposed in the connection between the condenser and the evaporator. In a refrigerating system of the character mentioned, we prefer also to interpose in the connection between condenser and evaporator a suitable dehydrating device 21 of any suitable or convenient form, and this dehydrating device is preferably connected between the condenser and the valve 11.

The float valve 11 is of unusually simple construction, comprising a cylindrical sheet metal shell 23 forming side walls and an integral top wall. The lower end of the shell 23 is closed by means of a sheet metal cover 25 of generally semi-spherical configuration which is sealed at its edges, as at 27, to the edges of the shell 23 in any suitable fashion in order to form a sealed housing providing a float chamber. At its upper end the shell 23 carries an inlet fitting, comprising a nipple 29 sealed in an opening formed in the shell. The nipple has a channel, the inner end of which opens into the shell and carries a filter element 31, which is preferably formed as a wire screen. The outer end of the nipple 29 is threaded for connection with the connection leading from the condenser and through which the condensed liquid refrigerant may be delivered into the float chamber. The cup-shaped portion 25 is adapted to receive a preferably spherical float member 33 carrying a valve stem 35 in position to engage a valve seat 37 formed in an element 39 comprising a fitting sealed in an opening 41 in the bottom of the element 25. The shell element 25 has an annular strengthening embossment 43 around the opening 41, and the fitting is formed with a socket 45 opening inwardly of the float chamber and adapted to receive the end of a sleeve 47 which, in turn, is sealed in the socket in any suitable fashion, as for instance by the brazing shown at 49. The sleeve 47 provides a channel 51 for receiving and guiding the valve stem 35. The valve seat 37 is formed in the fitting 39 in communication with the lower end of the channel 51, which is flared as at 53 to provide a valve seat chamber 55. The valve seat defines a channel 57 communicating with a socket 59 formed in the fitting 39 and opening outwardly of the shell portion 25, providing for connection with the conduit leading to the evaporator 17. The element 25 may also carry supporting legs 61, by which the casing forming the float chamber may be supported in operative position.

As liquid at the discharge pressure of the compressor is delivered, the level of liquid rises in the float chamber and eventually lifts the float 33 and raises the valve stem 35 from the valve seat 37, thus permitting liquid to pass from the float chamber through the channel 57 into the delivery conduit leading to the evaporator. The walls of the casing 23 are provided with an annular inwardly extending bead 63 adapted to interfittingly receive and support a correspondingly grooved annular element 65 which is located within the float chamber and positioned to engage and limit the upward movement of the float 33, and thus prevent the float from rising to a height within the float chamber permitting the valve stem 35 being entirely withdrawn from the guide sleeve 47.

Figure 1:
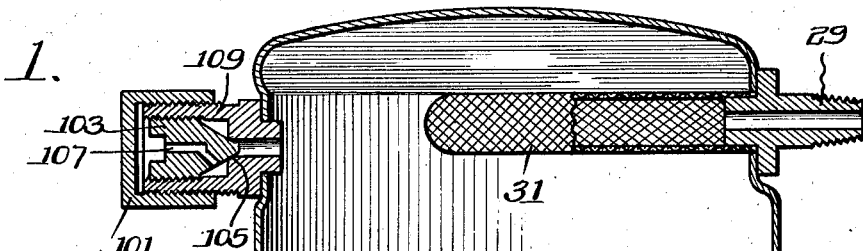
Fig. 1 is a vertical section through a float valve, embodying our present invention.
Figure 2:
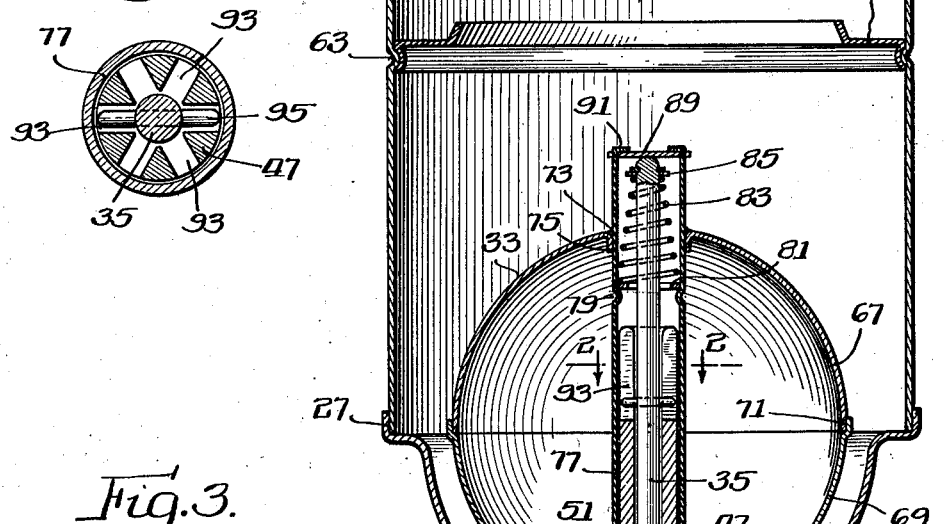
Fig. 2 is a sectional view taken substantially along the line 2—2 in Fig. 1.

The float 33 may, of course, be of any suitable or convenient construction. However, we prefer to form the same as a pair of co-operating semi-spherical shells 67 and 69, the edges of which are formed with interfitting overlapping portions 71, which are sealed together to form an hermetical closure. The globe-like shell thus formed is provided with perforations 73, preferably defined by annular flanges 75, and a sleeve-like element 77 is mounted in said openings in position extending through the globe-like float. The flanges 75 snugly receive the sleeve 77 and the sleeve is sealed in said openings. The sleeve 77 slidingly receives the sleeve-like support 47 so that the float, as well as the valve stem 35, are guided by the support. Near its upper end the sleeve 77 is formed with an internal annular bead 79 adapted to form a seat for a washer 81, forming a bearing for the lower end of a helical spring 83, the upper end of which bears against a washer 85 which is secured to the upper end of the valve stem 35, said upper end projecting upwardly of the sleeve 47 within the sleeve 77, the upper end of which is closed above the valve stem by means of a disk 89 which is held in place by flanged lugs 91 formed on the sleeve 77. The disk 89 is, of course, applied after the valve stem 35, with assembled spring 83 and washers 81 and 85, has been assembled in the sleeve 77. The disk also is sealed to the sleeve in a gas-tight fashion. The upper end of the guide sleeve 47 is provided with a plurality of diametral slots 93, as clearly illustrated in Fig. 2, and the valve stem 35 carries a pin 95, the opposite ends of which extend outwardly of the valve stem and ride in one of the slots 93 in order to prevent the stem from turning with respect to the sleeve 47. This arrangement, of course, insures that the seat engaging end of the stem will not rotate with respect to the valve seat, so that should the valve stem and seat become worn in an eccentric fashion during service, the valve will not leak through relative rotation of the worn parts. The lower portion of the sleeve 47 between the fitting 39 and the float is provided with a plurality of radially extending channels 97 through which liquid from the float chamber may enter the channel 51 and pass thence to the valve seat chamber 55. From the foregoing description it will be noted that the float is connected to the valve stem by a spring 83, which is preferably stiff enough to support the weight of the valve stem under normal conditions. The spring, however, is sufficiently soft to permit the valve stem to shift downwardly with respect to the float and permit the valve to close when the liquid level within the float chamber is low enough to permit the valve engaging end of the valve stem to enter the chamber 55 and come within the suction effect applied in said chamber 55 from the evaporator when the valve is open, it being remembered that the evaporator and the connection from the valve to the evaporator forms a part of the low pressure zone of the refrigerating system. It will be seen that the resilient non-positive connection between the float and the valve stem permits the valve to close rapidly when the float nears closing position. The valve, also, remains closed until the float has been lifted an appreciable distance, at which instant the valve rapidly opens under the influence of increased spring tension.

The top of the sleeve 77 is sealed in order to prevent any gas which may accumulate in the upper portions of the sleeve from being sucked out when the valve stem disengages the seat 37. In other words, the gas remains entrapped in the upper portions of the sleeve 77 and liquid only is drawn through the radial openings 97, thence through the chamber 55, the valve seat, and into the delivery line to the evaporator.

When the valve mechanism is assembled as a part of a refrigerating system of the character mentioned, we find it convenient to provide the valve chamber with means permitting the system to be loaded with the refrigerating medium at this point, it being understood that the system is hermetically sealed to prevent the escape of the refrigerating medium. To this end the casing 23, in its upper portions, is provided with a channel fitting 99 sealed in an opening in the casing with its channel opening at one end into the float chamber. The fitting 99 outwardly of the float chamber is externally threaded to receive a cover cap 101 for sealing the fitting. The outer end of the channel is also internally threaded to receive a valve element 103, and the channel of the fitting is formed with a valve seat 105 inwardly of said threaded portion. The valve element 103 is provided with a channel 107 which, when the valve is raised from its seat, provides communication between the outer and inner ends of the fitting 99, but which is so arranged that communication between the outer and inner ends of the fitting is sealingly prevented by engagement of said valve element on the seat 105 when the valve is seated. The system may be loaded with the refrigerating medium by removing the cap 101 and the valve element 103 entirely from the fitting 99. A refrigerant delivery line may then be connected to the fitting as by threading the line upon the outer threads of the fitting. A desired amount of refrigerant may then be pumped into the system under pressure, the compressor 15 being operated during the loading process in order to distribute the refrigerant properly in the system. After the loading is completed, the refrigerant delivery connection is removed and the valve element 103 inserted in the fitting 99, the valve element, however, being not immediately seated. A vacuum connection may then be applied as by threading the same upon the threads of the fitting normally carrying the cover cap, the vacuum connection preferably having means manually operable to turn the valve element 103 within the fitting without removing the vacuum connection. The vacuum connection may be maintained for a sufficient interval to permit withdrawal from the system of all air and moisture which may have entered with the refrigerant during the loading operation, the compressor, during this air and moisture evacuation process, being preferably blanketed so that the system is in operation at a relatively higher temperature than would otherwise be the case, to thus drive off any air and moisture dissolved or occluded in the refrigerant. Since the refrigerant is in liquid condition when it reaches the float chamber, all air and moisture entrapped in the system may be drawn off through the fitting without removing any material quantity of the refrigerant. After all air and moisture has thus been removed from the system, the valve 103 may be tightly seated in the fitting 99, the exhaust connection removed and the cover cap 101 applied.

The compressor, condenser and evaporator may, of course, be of any suitable or preferred construction, and any suitable or convenient refrigerant may be employed. We prefer, however, to utilize a compressor, condenser and evaporator of the form and character shown in the co-pending application of Kenney and Constantine for Refrigerating system, Serial No. 734,076, filed July 7, 1934, and to utilize as a refrigerating medium dichloromethane, although obviously any suitable refrigerant may be employed. In such a system, we also prefer to lubricate the compressor with a suitable mineral lubricating oil carried in a bath or reservoir within the compressor, which embodies preferably an electrical motor hermetically sealed together with the compressor mechanism within an enclosing housing. Most of the lubricant will be retained within the compressor casing and will be circulated to the operating parts of the motor and compressor by means of a built-in lubricant pump. A part of the lubricant may, of course, be carried over into the compressor and eventually delivered to the evaporator, and suitable means, such as is illustrated and described in the co-pending application of Kenney and Constantine aforesaid, may be utilized for returning the lubricant from the evaporator to the compressor.

It is thought that the invention and its numerous attendant functions and advantages will be understood from the foregoing description; and it is obvious that numerous changes may be made in the form, construction and arrangement of the several parts of the illustrated apparatus without departing from the spirit and scope of the invention, and without sacrificing any of its attendant advantages, the embodiment herein shown being merely a preferred arrangement for the purpose of illustrating our inventive concept.

What we claim as new and desire to secure by Letters Patent of the United States is:

1. A float valve comprising seat forming means forming a valve seat and float valve mechanism comprising a float and a valve element carried by said float in position to engage the valve seat, a sleeve-like extension on said seat forming means providing a guide for said valve element, said float comprising a sealed shell and means forming a channel through said shell and adapted to receive said guide whereby to support the float thereon, said channel being open at one end to receive said guide and closed at its other end, a conical spring encircling said valve element within the closed end of the channel, said spring having an end of small diameter fastened to the valve element and an end of large diameter bearing upon said float and means operatively associated with said seat forming means and providing an enclosing casing for said valve mechanism.

2. A float valve comprising seat-forming means providing a valve seat and float valve mechanism comprising a float and a valve element carried yieldingly on said float and having a portion extending in position to engage the valve seat, including resilient means yieldingly connecting the valve element and float and serving to normally urge the valve on the float in a direction away from said seat.

3. A float valve comprising seat-forming means providing a valve seat and float valve mechanism comprising a float and a valve element carried yieldingly on said float and having a portion extending in position to engage the valve seat, including resilient means yieldingly connecting the valve element and float and serving to normally urge the valve on the float in a direction away from said seat, and means to limit the movement of the valve element with respect to said float under the influence of said resilient means.

4. A float valve comprising seat-forming means providing a valve seat and float valve mechanism comprising a hollow vessel forming a float, a sleeve extending through said vessel and forming a channel open at one end, means forming a stop in the opposite end of the channel, said channel being adapted to receive a float guide therein through the open end of the channel, said channel also receiving a valve stem in position to engage the valve seat, said stem having a portion adapted to engage said stop, and spring means in said sleeve and operatively associated with said stem for the purpose of yieldingly urging the same against said stop.

5. A float valve comprising seat-forming means providing a valve seat and float valve mechanism comprising a hollow vessel forming a float, a sleeve extending through said vessel and forming a channel open at one end, means forming a stop in the opposite end of the channel, said channel being adapted to receive a float guide therein through the open end of the channel, said channel also receiving a valve stem in position to engage the valve seat, said stem having a portion adapted to engage said stop, spring means in said sleeve and operatively associated with said stem for the purpose of yieldingly urging the same against said stop, said sleeve being formed to provide a seat for one end of said spring.

6. A float valve comprising seat-forming means providing a valve seat and float valve mechanism comprising a hollow vessel forming a float, a sleeve extending through said vessel and forming a channel open at one end, means forming a stop in the opposite end of the channel, said channel being adapted to receive a float guide therein through the open end of the channel, said channel also receiving a valve stem in position to engage the valve seat, said stem having a portion adapted to engage said stop, and spring means in said sleeve and operatively associated with said stem for the purpose of yieldingly urging the same against said stop, said sleeve being formed with an inwardly extending annular ridge and a washer encircling said stem and engaging said ridge to provide a seat for one end of said spring, said spring being connected at its other end with said stem.

7. A float valve comprising seat forming means providing a valve seat and float valve mechanism comprising a float and a valve element carried yieldingly on said float and having a portion extending in position to engage the valve seat, and a coiled spring encircling said valve element and yieldingly connecting the valve element and float whereby to urge the valve with respect to the float in a direction away from said seat.

8. A float valve comprising seat forming means providing a valve seat and float valve mechanism comprising a float and a valve element carried yieldingly on said float and having a portion extending in position to engage the valve seat, and a conical spring encircling said valve element and having a portion of relatively small diameter secured to the valve element and an end of relatively larger diameter bearing upon said float whereby to urge the valve on the float in a direction away from said seat when said spring is compressed.

MAHLON W. KENNEY.
ARTHUR R. CONSTANTINE.
CECIL W. PRESTON.